United States Patent
Sugiyama et al.

(10) Patent No.: US 8,196,962 B2
(45) Date of Patent: Jun. 12, 2012

(54) PRETENSIONER

(75) Inventors: Motoki Sugiyama, Aichi-ken (JP); Seiji Hori, Aichi-ken (JP); Tomonori Nagata, Aichi-ken (JP); Tetsushi Muromachi, Aichi-ken (JP); Masaru Ukita, Aichi-ken (JP); Katsuki Asagiri, Aichi-ken (JP); Tomohiro Okuhira, Aichi-ken (JP); Naoki Urakawa, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 86 days.

(21) Appl. No.: 12/883,132

(22) Filed: Sep. 15, 2010

(65) Prior Publication Data

US 2011/0068614 A1    Mar. 24, 2011

(30) Foreign Application Priority Data

Sep. 18, 2009  (JP) ................................. 2009-217290

(51) Int. Cl.
*B60R 22/46* (2006.01)
(52) U.S. Cl. ....................................... 280/806; 297/480
(58) Field of Classification Search .................. 280/806; 60/632, 637; 297/480
See application file for complete search history.

(56) References Cited

U.S. PATENT DOCUMENTS

| 4,023,427 | A | * | 5/1977 | Beier | 297/480 |
| 4,458,921 | A | * | 7/1984 | Chiba et al. | 280/806 |
| 5,887,897 | A | * | 3/1999 | Gill et al. | 280/806 |
| 6,877,776 | B2 | * | 4/2005 | Ukita et al. | 280/806 |
| 7,784,832 | B2 | * | 8/2010 | Zasu et al. | 280/807 |
| 7,862,081 | B2 | * | 1/2011 | Thomas | 280/733 |
| 7,878,548 | B2 | * | 2/2011 | Kohama | 280/806 |
| 8,132,829 | B2 | * | 3/2012 | Sugiyama et al. | 280/806 |

FOREIGN PATENT DOCUMENTS

JP      2005-528288 A    9/2005

* cited by examiner

*Primary Examiner* — Joseph Rocca
(74) *Attorney, Agent, or Firm* — Roberts Mlotkowski Safran & Cole, P.C.

(57) ABSTRACT

In the present pretensioner, press contact portions are formed further to a side of an open end of a packing housing section than central portions of opposing faces along a depth direction of the packing housing section. Accordingly, when a packing is being fitted into the packing housing section, no great resistance is imparted to a curved face side of the packing from a press contact wall of a housing section body and the opposing face, and the packing is fitted comparatively smoothly therein. Consequently, even when fitting the packing into the packing housing section, a packing main body is largely resilient-deformed, such that a large collapse in a through hole can be prevented, and the sealing ability of the seal due to deformation of the packing main body can be effectively enhanced.

5 Claims, 9 Drawing Sheets

FIG.9

# PRETENSIONER

CROSS-REFERENCE TO RELATED APPLICATION

This application claims priority under 35 USC 119 from Japanese Patent Application No. 2009-217290 filed Sep. 18, 2009, the disclosure of which is incorporated by reference herein.

BACKGROUND

1. Technical Field

In a vehicle seatbelt device configured with an anchor fixed to the leading end of a webbing belt, or a buckle device to which a tongue provided to the webbing belt is mounted, the present invention relates to a pretensioner that pulls either the anchor or the buckle when, for example, there is rapid vehicle deceleration, thereby increasing tensioning force on the webbing belt.

2. Related Art

A pretensioner provided with a seal inside a bore is described in Japanese National-Phase Publication No. 2005-528288. A hole is formed in the bore for passing a cable through, and the hole is formed in a taper shape that is thinner at the leading end side along the length direction of the cable passing through the hole than at a central portion of the seal, with the bore internal peripheral shape also corresponding to the seal shape. When gas is fed into the bore, the pressure of the gas moves the cable along the cable length direction towards the base end side, and presses the tapered face of the seal against the taper face at an inner peripheral portion of the bore. Furthermore, due to deformation of the seal when press-contacted in this manner by the gas pressure, the internal peripheral portion of the through hole in the seal through which the cable passes is pressed against the outer peripheral portion of the cable. Due thereto, the sealing ability is enhanced, and pressure of the gas effectively contributes to movement of the cable.

Japanese National-Phase Publication No. 2005-528288 has stated objectives of making the space smaller through which the gas and cable pass in a base cartridge corresponding to the core, and facilitating operation to fit the seal into the base cartridge for improving the sealing ability. Accordingly, an opening that opens the space for fitting the seal to the outer peripheral face of the base cartridge and opens in an axis-orthogonal direction (the axial direction is the length direction of the cable inside the space), could be considered.

In such a configuration, the internal peripheral shape of the portion housing the seal cannot be made the taper shape like that of Japanese National-Phase Publication No. 2005-528288. Consequently, since the seal cannot be made in the taper shape, separate means is required to improve the sealing ability of the seal.

SUMMARY

The present invention is made in consideration of the above circumstances and provides a pretensioner that can effectively improve the sealing ability of the seal without making the shape of the seal and the portion housing the seal to be a taper shape.

A first aspect of the present invention is a pretensioner including: a coupling section, a leading end side of the coupling section being either attached to an anchor that is attached to a length direction leading end portion of a webbing belt configuring a seatbelt device, or attached to a buckle for mounting a tongue provided at a length direction intermediate portion of the webbing belt; a pretensioner body, a base end side of the coupling section extending from the leading end side of the coupling section attached to the anchor or the buckle passing through an inside of the pretensioner body; a gas generation section that generates gas by actuation, causing the coupling section to move towards a length direction base end side of the coupling section due to pressure of the gas supplied into the pretensioner body; a seal housing section formed in the pretensioner body on a through passage of the coupling section, the seal housing section having an opening to an external face of the pretensioner body towards a direction that intersects with the length direction of the coupling section passing through an inside of the seal housing section; and a seal section, the seal section being formed with a through hole through which the coupling section passes and being housed in the seal housing section from the opening of the seal housing section in the pretensioner body, the seal section having a press contact portion that, in a state in which the seal section is housed in the seal housing section and the coupling section has been passed through the through hole, is capable of pressing to contact with at least one of an internal wall of the seal housing section or the coupling section, and the seal section sealing between the seal section and at least one of the internal wall of the seal housing section or the coupling section due to the press contact portion pressing at least one of the internal wall of the seal housing section or the coupling section.

In the pretensioner according to the first aspect of the present invention, the gas generation section is actuated, the gas is generated in the gas generation section, and when the gas is supplied into the pretensioner body, the pressure of the gas moves the coupling section towards the length direction base end side. Since the leading end side of the coupling section is attached to either the buckle or the anchor, the buckle or the anchor is pulled by the coupling section moving towards the length direction base end side.

In cases where the buckle is pulled, the webbing belt, to which the tongue that is mounted to the buckle is provided, is also pulled. In contrary, in cases where the anchor is pulled, the webbing belt, which has its leading end attached to the anchor, is pulled. By pulling the webbing belt in this manner, the body of an occupant fitted over with the webbing belt is strongly restrained by the webbing belt.

However, as described above, the leading end side of the coupling section is attached to the anchor or buckle, and the length direction intermediate portion of the coupling section further to the leading end side extends to the outside of the pretensioner body. Accordingly, when the gas generation section is actuated as described above, a portion of the gas supplied into the pretensioner body attempts to leak to the outside of the pretensioner body along the coupling section. The seal housing section is formed in the pretensioner body on the through passage of the coupling section, and the seal section is housed in the seal housing section.

In a state in which the seal section is housed in the seal housing section, the coupling section passes through the through hole formed in the seal section. In this state, the press contact portion provided to the seal section presses to contact with at least one of the inner wall of the seal housing section and the coupling section. Thus, sealing is made between the seal section and whichever of the inner wall of the seal housing section and the coupling section the press contact portion presses. Accordingly, the sealing ability between the seal section and whichever of the inner wall of the seal housing section and the coupling section the press contact portion presses is effectively enhanced, and the pressure of the gas can efficiently contribute to moving the coupling section towards the base end side.

However, in the pretensioner according to the present invention, the seal housing section has the opening to the external face of the pretensioner body in the direction that intersects with the length direction of the coupling section inside the seal housing section. Consequently, fitting the seal section to the seal housing section, namely fitting the seal section to the pretensioner body, is simple.

Furthermore, in the present invention, as described above, the seal housing section has the opening to the external face of the pretensioner body in the direction that intersects with the length direction of the coupling section inside the seal housing section. Consequently, the shape of the inside of the seal housing section cannot be given a gradual tapering inner peripheral shape that gradually gets thinner in the direction intersecting with the length direction of the coupling section. However, as described above, the press contact portion of the seal section presses at least one of the inner wall of the seal housing section and the coupling section, sealing between the seal section and at least one of the inner wall of the seal housing section and the coupling section. Hence, the sealing ability can be effectively enhanced even without forming the inside of the seal housing section in the taper shape, and accordingly the degrees of freedom in design are raised for the forming position of the seal housing section in the pretensioner body, and the shape of the seal housing section.

A pretensioner of a second aspect of the present invention is the first aspect of the present invention, wherein: the seal housing section is formed in a bottomed shape having a bottom portion at the opposite side from the opening of the seal housing section in the external face of the pretensioner body; and the press contact portion is formed to project out from an end portion of the seal section that faces the internal wall of the seal housing section towards the internal wall of the seal housing section, presses to contact with the internal wall of the seal housing section, and is provided nearer to the opening of the seal housing section than a central portion of the seal section along a depth direction of the seal housing section.

In the pretensioner of the second aspect of the present invention, the seal housing section is formed in the bottomed shape having the bottom portion at the opposite side from the opening of the seal housing section in the external face of the pretensioner body, and the seal section is fitted in from the opening of the seal housing section in the external face of the pretensioner body. The press contact portion is formed to project out around a periphery of the opening at the through hole of the seal section, however the press contact portion is formed nearer to the opening of the seal housing section than a central portion of the seal section along the depth direction of the seal housing section. Consequently, deformation of the seal section when the seal section is being fitted into the seal housing section can either be suppressed or prevented.

A pretensioner of a third aspect of the present invention is the first aspect of the present invention, wherein: the seal housing section includes a housing side step portion that has an opening to the external face of the pretensioner body and is provided with a bottom portion on an opposite side from the opening of the housing side step portion at the external face of the pretensioner body, and a housing main body that opens at the bottom portion of the housing side step portion and opens at an internal wall to the through hole; and the seal section includes a seal main body housed in the housing main body, and a seal side step portion that is integrally formed at the seal main body, and contacts the bottom portion of the housing side step portion in a state in which the seal main body is housed in the housing main body.

According to the pretensioner of the third aspect of the present invention, the seal housing section is configured including the bottomed housing side step portion has the opening to the external face of the pretensioner body, and the housing main body that opens at the bottom portion of the housing side step portion. The seal main body configuring the seal section is housed in the seal housing section, and the seal side step portion that is integrally formed at the seal main body is housed in the housing side step portion.

In a state in which the seal section is housed in the seal housing section in such a manner, the seal side step portion contacts the bottom portion of the housing side step portion. Consequently, even if the gas generated by the gas generation section passes through the through hole and enters between the inner wall of the housing main body configuring the seal housing section and the seal main body of the seal section to deform the seal section, the contact is maintained in this state between the bottom portion of the housing side step portion, facing in the different direction to the deformation direction of the seal section, and the seal side step portion. Consequently, the contact between the housing side step portion and the seal side step portion is not readily affected by such distortion of the seal section as described above, and the sealing ability between the housing side step portion and the seal side step portion is maintained. Due thereto, the sealing ability is enhanced.

A pretensioner of a fourth aspect of the present invention is the first aspect of the present invention, wherein a bottom portion is provided to the seal housing section at an opposite side from the opening of the seal housing section in the external face of the pretensioner body, and the bottom portion curves around so as to open towards the opening.

According to the pretensioner of the fourth aspect of the present invention, the bottom portion is provided to the seal housing section at the opposite side from the opening of the seal housing section in the external face of the pretensioner body. The bottom portion is formed in a concave shape so as to curve around so as to open towards the opening of the seal housing section.

The gas generated by the gas generation section that has passed through the through hole formed in the pretensioner body is able to pass between the inner wall of the seal housing section and the seal section, around to the bottom portion side of the seal housing section. However, in the pretensioner according to the present invention as described above, since the bottom portion of the seal housing section is formed in the curved concave shape, the mechanical strength can be improved in the vicinity of the bottom portion against, for example, the pressure of the above gas.

A pretensioner of a fifth aspect of the present invention is the first aspect of the present invention, wherein: the seal section has a face that faces at least one of the internal wall of the seal housing section or the coupling section; a gas intake portion is formed at the seal section, the gas intake portion opening towards an upstream side of a flow of gas moving towards the seal housing section along the length direction of the coupling section and the gas moving towards the seal housing section along the length direction of the coupling section being taken inside the gas intake portion; and pressure of the gas taken inside the gas intake portion causes the press contact portion to contact at least one of the internal wall or the coupling section.

In the pretensioner of the fifth aspect of the present invention, the gas intake portion is formed at the seal section. The gas intake portion opens towards the upstream side of the flow of the gas moving towards the seal housing section along the length direction of the coupling section. When the gas that has flowed along the direction of the coupling section and passed between the seal section and the inner wall of the seal housing section flows into the gas intake portion (namely, when the gas intake portion takes in gas), the gas presses the inside wall of the gas intake portion outwards. Consequently, as the seal section deforms, the press contact portion in the seal section that has the face facing at least one of the inner wall of the seal housing section and the coupling section, presses against at least one of the inner wall of the seal housing section and the coupling section.

In this manner, when the press contact portion of the seal section presses at least one of the inner wall of the seal housing section and the coupling section, sealing is made even more effectively between the seal section and whichever of the inner wall of the seal housing section and the coupling section is pressed by the press contact portion. Accordingly, since gas is effectively suppressed from passing between the seal section and whichever of the inner wall of the seal housing section and the coupling section is pressed by the press contact portion, the sealing ability is effectively enhanced, and the pressure of the gas can efficiently contribute to moving the coupling section towards the base end side.

However, the gas intake portion is formed at the seal section as described above, and the pressure of the gas taken into the gas intake portion can effectively improve the sealing ability. Namely, by application of the present invention, since the sealing ability can be effectively enhanced even without making the shape of the inside of the seal housing section to be a taper shape, the degrees of freedom in design are raised for the forming position of the seal housing section in the pretensioner body, and the shape of the seal housing section.

BRIEF DESCRIPTION OF THE DRAWINGS

Exemplary embodiments of the present invention will be described in detail based on the following figures, wherein.

DETAILED DESCRIPTION

<First Exemplary Embodiment>

Figure 1:
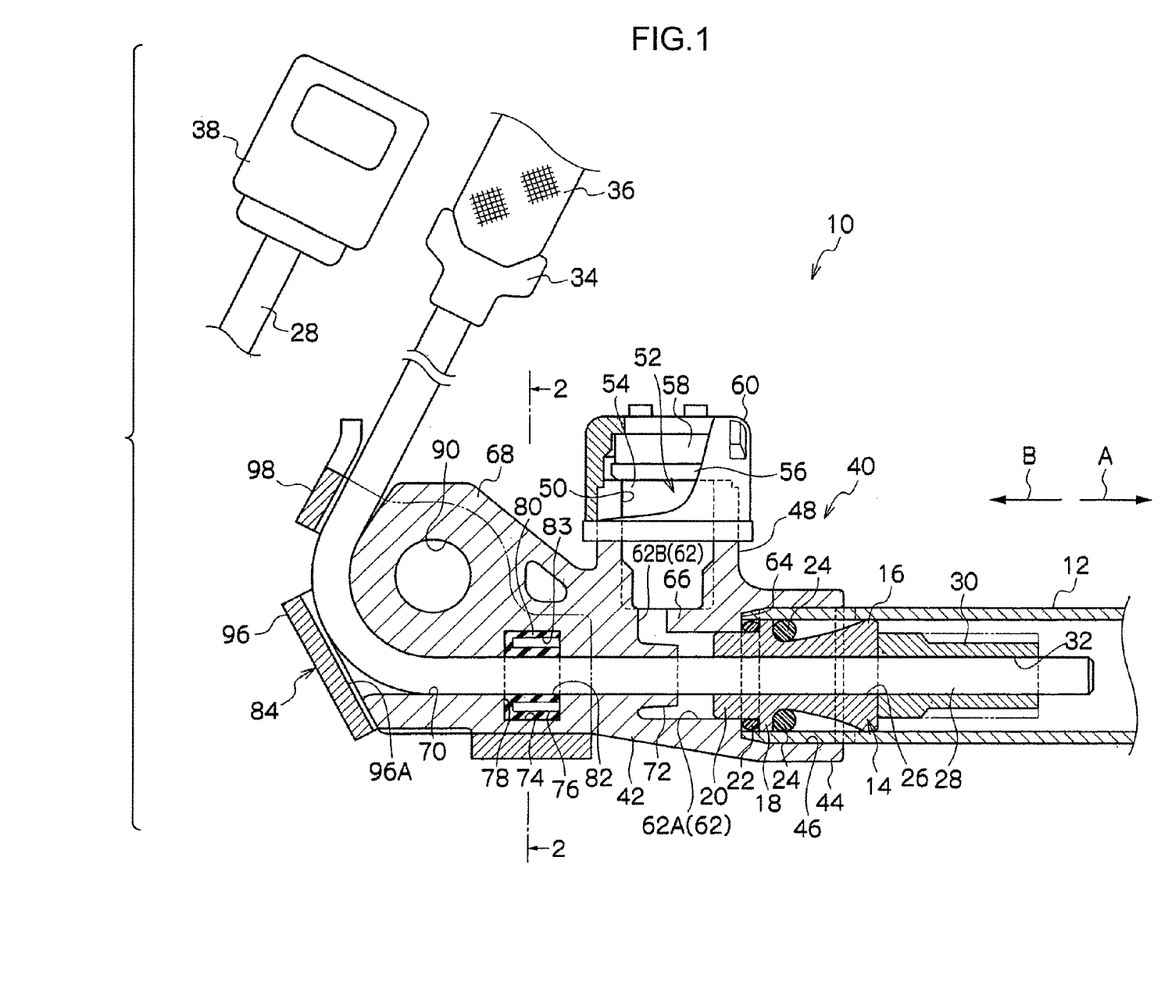
FIG. 1 is a cross-section showing a configuration of a pretensioner according to a first exemplary embodiment of the present invention.

FIG. 1 shows, in cross-section, a configuration of a pretensioner 10 according to a first exemplary embodiment of the present exemplary embodiment.

As shown in FIG. 1, the pretensioner 10 is equipped with a cylinder 12. The cylinder 12 is formed in a cylindrical shape (a bottomed or bottomless circular cylindrical shape, for example). A piston 14 is accommodated inside the cylinder 12. The piston 14 is provided with a piston body 16. The piston body 16 has a gradually increasing external diameter on progression towards the leading end side of the cylinder 12 (the arrow A direction side in FIG. 1), and at least the external peripheral shape of an end portion of the piston body 16 at the cylinder 12 leading end side is formed in a truncated conical shape substantially equivalent to the inner peripheral shape of the cylinder 12.

A flange portion 18 with an external peripheral shape of substantially equivalent shape to the inner peripheral shape of the cylinder 12 is formed at an end portion of the piston body 16 at the cylinder 12 base end side (the arrow B direction side in FIG. 1), with the flange portion 18 being formed substantially coaxial to the end portion of the piston body 16 at the cylinder 12 base end side. The flange portion 18 and the end portion of the piston body 16 at the leading end side of the cylinder 12 are in sliding contact with inner peripheral portions of the cylinder 12, and the piston 14 can slide between the leading end of the cylinder 12 and the other end thereof. A smaller diameter portion 20 is formed at an end portion of the flange portion 18 at the cylinder 12 base end side, the smaller diameter portion 20 having a smaller outer diameter dimension than that of the flange portion 18 and being formed substantially coaxially to the flange portion 18.

An O-ring 22 is fitted over an external peripheral portion of the smaller diameter portion 20, the O-ring 22 being formed in an annular shape from a rubber material or from a synthetic resin material having resilience about the same as that of rubber. The O-ring 22 closely fits over an entire region around the external periphery direction of the smaller diameter portion 20, and also closely fits inside an inner peripheral portion of the cylinder 12, with the leading end side of the cylinder 12 sealed off from the other end of the cylinder 12 by the boundary formed by the O-ring 22.

Plural clutch balls 24 are placed at appropriate intervals around the external peripheral direction of the piston body 16, beside the flange portion 18 at the leading end side of the cylinder 12. The diameter dimension of each of the clutch balls 24 is set to be equal to, or less than, ½ the difference between the inner diameter dimension of the cylinder 12 and the outer diameter dimension of the piston body 16 in the vicinity of the end portion of the piston body 16 at the flange portion 18 side. When the piston 14 has moved from the base end side of the cylinder 12 to the leading end side of the cylinder 12 (namely, when the piston 14 has slid inside the cylinder 12 in the arrow A direction of FIG. 1), as each of the clutch balls 24 moves along the outer peripheral face (sloping face) of the piston body 16 due to inertia, each of the clutch balls 24 is nipped between an external peripheral portion of the piston body 16 and an internal peripheral portion of the cylinder 12.

When the piston 14 moves from this state further towards the leading end side of the cylinder 12, the clutch balls 24 moving towards the leading end side of the cylinder 12 together with the piston 14 deform the inner peripheral side of the cylinder 12, or dig into the internal peripheral portion of the cylinder 12. Friction due to the clutch balls 24 deforming or wearing the cylinder 12 then restricts sliding movement of the piston 14 towards the base end side of the cylinder 12.

A through hole 26 is formed in the piston 14. One end of the through hole 26 is open to the face of the piston body 16 at the opposite side to that of the flange portion 18, and the other end of the through hole 26 is open to the face of the smaller diameter portion 20 at the opposite side to that of the flange portion 18. The pretensioner 10 is equipped with a wire 28, serving as a coupling section, and the wire 28 passes through the through hole 26. A piece 30 is provided at the side of the piston 14 at the leading end side of the cylinder 12. A through hole 32 is formed in the piece 30, and the wire 28 passes through the through hole 32. Pull-out prevention is effected on the wire 28 that has passed through the through hole 32 through to the opposite side from the piece 30 to that of the piston 14, such that the wire 28 is not able to pass back through and come out from the piston 14 side of the piece 30. Consequently, the wire 28 passes through the through hole 26 and is restricted from coming out from the opposite side of the piston 14 to that of the piece 30.

An end portion of the wire 28, at the opposite end to the end provided with the piece 30, is, for example, attached to an anchor plate 34, serving as an anchor and configuring a three point seatbelt device that is one mode of vehicle seatbelt device. While not shown in detail in the drawings, the anchor plate 34 is provided in the vicinity of a floor portion of the vehicle at one of the width direction sides of a seat installed in the vehicle compartment. The distal end of a long belt-shaped webbing belt 36 configuring the three point seatbelt device is attached to the anchor plate 34. The base end of the webbing belt 36 passes through a through anchor provided in the vicinity of the ceiling of the vehicle at the width direction side of the seat and folds back downwards, with the base end of the webbing belt 36 attached to a spool of a webbing take-up device provided in the vicinity of a portion of the floor of the vehicle at the width direction side of the seat.

Between the above through anchor and the anchor plate 34 the webbing belt 36 passes through a tongue plate. An occupant seated in the seat pulls out the webbing belt 36 from the spool of the webbing take-up device, passes the webbing belt 36 around the front of their body. In this state, by fitting the tongue plate into a buckle 38 provided in the vicinity of the floor of the vehicle at the other width direction side of the seat, a fitted state of the webbing belt 36 to the body of the occupant is achieved.

Note that whereas the explanation above is of a configuration in which a portion at the opposite end of the wire 28 to that provided with the piece 30 is attached to the anchor plate 34, configuration may be made such that a portion at the opposite end of the wire 28 to that provided with the piece 30 is attached to the buckle 38.

Furthermore, as shown in FIG. 1, the pretensioner 10 is equipped with a base cartridge 40, serving as a pretensioner body. The base cartridge 40 is equipped with a main body portion 42. A cylinder mounting portion 44 is formed at the main body portion 42. A mounting hole 46 is formed in the cylinder mounting portion 44. One end of the mounting hole 46 opens to the external peripheral face of the cylinder mounting portion 44. The inner diameter dimension at the open end of the cylinder mounting portion 44 is just marginally larger than the outer diameter dimension of the leading end side of the cylinder 12, such that the cylinder 12 can be insertion-fitted from its leading end into the open end of the mounting hole 46. For example, a female thread (not shown in the figures) is formed at an inner peripheral portion of the mounting hole 46, and a male thread (not shown in the figures) corresponding to the female thread is formed at an external peripheral portion at the leading end side of the cylinder 12. The cylinder 12 is joined to the base cartridge 40 by screwing the male thread of the cylinder 12 into the female thread of the mounting hole 46.

A gas generator mounting portion 48 is formed at the main body portion 42. The gas generator mounting portion 48 is formed on the side of the main body portion 42 along a direction intersecting with the opening direction of the mounting hole 46 of the cylinder mounting portion 44 (in particular, in the present exemplary embodiment, a direction substantially orthogonal thereto). A gas generator mounting hole 50 is formed at the gas generator mounting portion 48. A cap 60 has an opening in the face of the cap 60 that faces a plane of the external faces of the gas generator mounting portion 48 oriented in a direction intersecting with the opening direction of the mounting hole 46 (in particular, in the present exemplary embodiment, a direction substantially orthogonal thereto).

A gas generator 52, serving as a gas generation section, is attached to the gas generator mounting portion 48. The gas generator 52 is equipped with an insertion fitting portion 54. The external peripheral shape of the insertion fitting portion 54 is substantially equivalent to the inner peripheral shape of the gas generator mounting hole 50, and the gas generator 52 can be insertion-fitted into the open end of the gas generator mounting hole 50. A flange portion 56, having an external peripheral shape that is larger than the external peripheral shape of the gas generator 52, is formed at one end of the gas generator 52 (a portion at the top end in FIG. 1). When the insertion fitting portion 54 is being inserted into the gas generator mounting hole 50, the flange portion 56 interacts with the end portion of the gas generator mounting portion 48 at the opening end side of the gas generator mounting hole 50.

A head portion 58 is formed at the flange portion 56 at the opposite side to that of the insertion fitting portion 54. The cap 60 is mounted to the gas generator mounting portion 48 from the opposite side of the head portion 58 to that of the flange portion 56, and the gas generator 52 is prevented from coming out from the gas generator mounting portion 48 by the cap 60. On actuation the gas generator 52 mounted to the gas generator mounting portion 48 instantly generates gas, ejecting gas from an end portion of the insertion fitting portion 54 at the opposite side to that of flange portion 56.

A gas passage portion 62 is formed contiguous to the other end of the gas generator mounting hole 50 (at an end portion of the gas generator mounting hole 50 at the opposite side to the end of the gas generator mounting hole 50 open to the external face of the gas generator mounting portion 48). The gas passage portion 62 bends, from an intermediate portion thereof, around towards the open end side of the mounting hole 46. A cylinder-side passage portion 62A, this being a portion of the gas passage portion 62 on the mounting hole 46 side of the bent portion, has an inner diameter dimension smaller than the inner diameter dimension of the mounting hole 46. The end portion of the cylinder-side passage portion 62A (the gas passage portion 62) at the mounting hole 46 side opens to a bottom portion 64 of the mounting hole 46.

The inner diameter dimension of the cylinder-side passage portion 62A is substantially equivalent to the outer diameter dimension of the smaller diameter portion 20, and in a state in which the leading end of the cylinder 12 makes contact with the bottom portion 64 when the leading end side of the cylinder 12 has been insertion fitted into the mounting hole 46, the smaller diameter portion 20 intrudes into the cylinder-side passage portion 62A. Accordingly, gas ejected from the gas generator 52 is guided by the gas passage portion 62, and pressure from the gas guided by the gas passage portion 62 presses the smaller diameter portion 20 (namely, the piston 14) towards the base end side of the cylinder 12.

A protection wall 66 is provided to a generator-side passage portion 62B, the generator-side passage portion 62B being a portion of the gas passage portion 62 on the side of the potion of the gas generator mounting hole 50 further towards the bent portion of the gas passage portion 62. The protection wall 66 is formed at an inner peripheral portion of the generator-side passage portion 62B, on the side of the generator-side passage portion 62B further towards the open end of the mounting hole 46 than an intermediate portion in the opening radial direction of the generator-side passage portion 62B. Accordingly, gas ejected from the gas generator 52 passes through the generator-side passage portion 62B and flows into the cylinder-side passage portion 62A so as to detour through the gas passage portion 62.

The base cartridge 40 is equipped with a wire guide portion 68. The wire guide portion 68 is formed at the main body portion 42 at the opposite side to that of the cylinder mounting portion 44. A wire passage portion 70, serving as a coupling section through passage, is formed at the wire guide portion 68. The wire passage portion 70 opens along the opening direction of the cylinder-side passage portion 62A (the gas passage portion 62) in the bottom portion 64, and along the opening direction of the mounting hole 46 in the cylinder mounting portion 44, at the bent portion of the gas passage portion 62 (namely, at the boundary of the cylinder-side passage portion 62A and the generator-side passage portion 62B). The other end of the wire passage portion 70, opens to the wire guide portion 68 at the opposite side to that of main body portion 42.

The opposite end of the wire 28, passing through the through hole 26 of the piston 14 to that of the piece 30, passes through the wire passage portion 70 and leads out to the outside of the wire guide portion 68, and outside of the base cartridge 40. A portion of the inner peripheral face of the wire passage portion 70 bends around with a center of curvature in a radial direction of the opening of wire passage portion 70, and the wire 28 leads out to the outside of the base cartridge 40 from the other end of the wire passage portion 70, so as to curve around following the inner peripheral face of the wire passage portion 70 at the other end side of the wire passage portion 70.

A wire protection tube 72 is provided to the gas passage portion 62 at a portion corresponding to the end portion of the wire passage portion 70. The inner peripheral shape of the wire protection tube 72 is formed in a tube shape substantially equivalent to the inner peripheral shape of the wire passage portion 70. The wire protection tube 72 is formed coaxial to one end of the wire passage portion 70 so as to project out from the inner wall of the gas passage portion 62, and the wire 28 passing through the wire protection tube 72 intrudes into the wire passage portion 70.

The leading end side of the gas passage portion 62 faces the leading end side of the protection wall 66 along the direction of gas ejection from the gas generator 52. Accordingly, the gas ejected from the gas generator 52 hits the protection wall 66 and the wire protection tube 72, and is not blown directly onto the wire 28. However, the direction of flow of gas ejected from the gas generator 52 is changed to flowing towards the cylinder mounting portion 44 side by interposing the wire protection tube 72.

A packing housing section 74, serving as a seal housing section, is formed at the wire guide portion 68. The packing housing section 74 is formed at an intermediate portion of the wire passage portion 70 (namely, between one end of the gas passage portion 62 and the other). The packing housing section 74 is formed in a rectangular shape. In the packing housing section 74, a pair of sides facing each other, when viewed from the front of the base cartridge 40, is parallel to portions of the wire passage portion 70 adjacent to the packing housing section 74, and another pair of sides facing each other is orthogonal to the portions of the wire passage portion 70 adjacent to the packing housing section 74.

Among the internal walls of the rectangular shaped packing housing section 74 when viewed from the front face of the base cartridge 40, an internal wall along the piercing direction of the wire passage portion 70 facing towards one end of the wire passage portion 70 configures a press contact wall 76, serving as a restricting portion, and another internal wall facing towards the other end of the wire passage portion 70 configures a press contact wall 78.

The packing housing section 74 opens to an external face on the front face of the base cartridge 40, orthogonal to the piercing direction of the wire passage portion 70. Packing 80, serving as a seal, is housed in the packing housing section 74 that opens in this manner. The packing 80 is formed in a block shape from rubber or a resilient material having resilience of about the same as that of rubber, or a synthetic resin material having a higher rigidity than such resilient materials. The packing 80 is formed with its axial direction along the opening direction of the packing housing section 74, and has an external peripheral shape substantially equivalent to the inner peripheral shape of the packing housing section 74, or slightly larger than the inner peripheral shape of the packing housing section 74.

As shown in each of FIG. 1 to FIG. 4, a through hole 82 is formed in the packing 80. The inner diameter dimension of the through hole 82 is substantially equivalent to the outer diameter dimension of the wire 28, and in a state in which the packing 80 is housed in the packing housing section 74, one end of the through hole 82 is continuous with the wire passage portion 70 further to that end of the packing housing section 74, and the other end of the through hole 82 is continuous with the wire passage portion 70 further to that end of the packing housing section 74. Accordingly, the wire 28 passing through the wire passage portion 70, passes inside the packing housing section 74 through the through hole 82 of the packing 80. However, as explained above, since the inner diameter dimension of the through hole 82 is substantially equivalent to the outer diameter dimension of the wire 28, in a state in which the wire 28 has passed through the through hole 82, substantially no gap is formed between the inner peripheral portion of the through hole 82 and the external peripheral portion of the wire 28.

Figure 2:
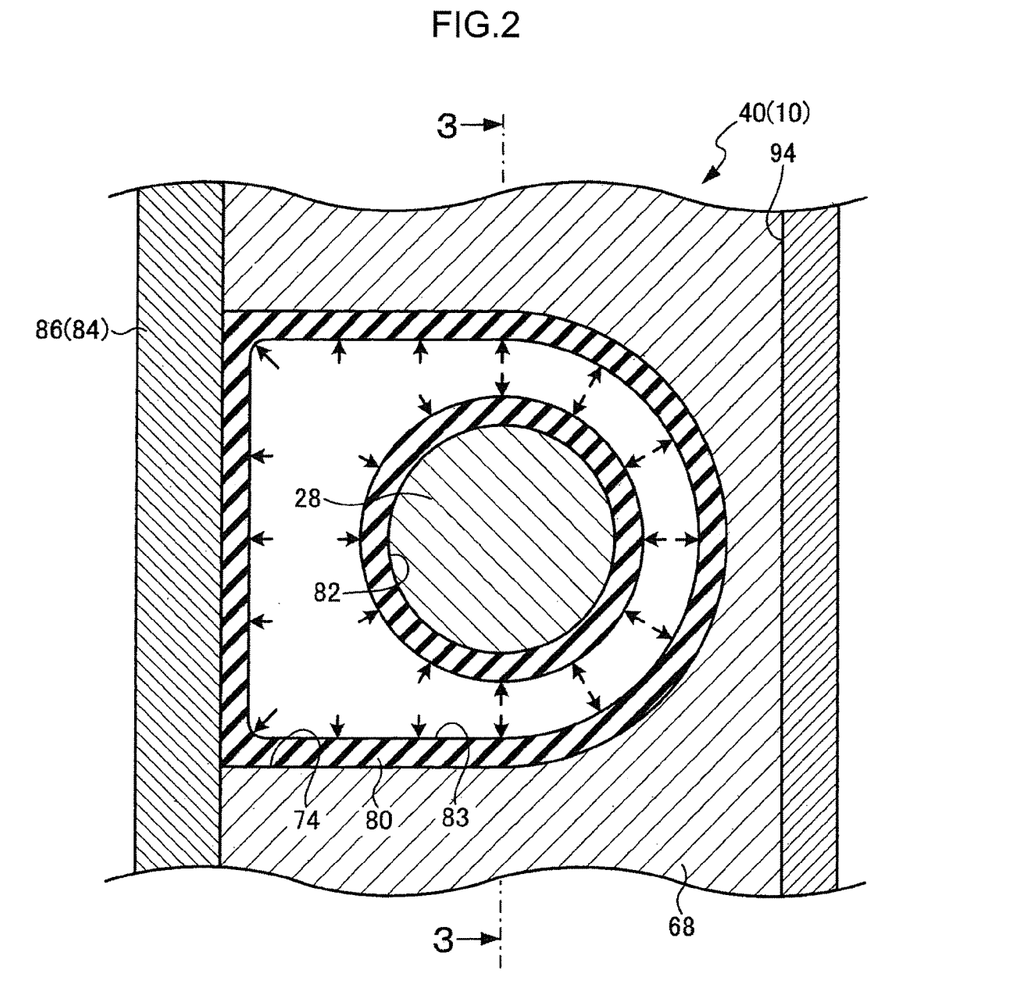
FIG. 2 is an enlarged cross-section of relevant parts taken on line 2-2 of FIG. 1.
Figure 3:
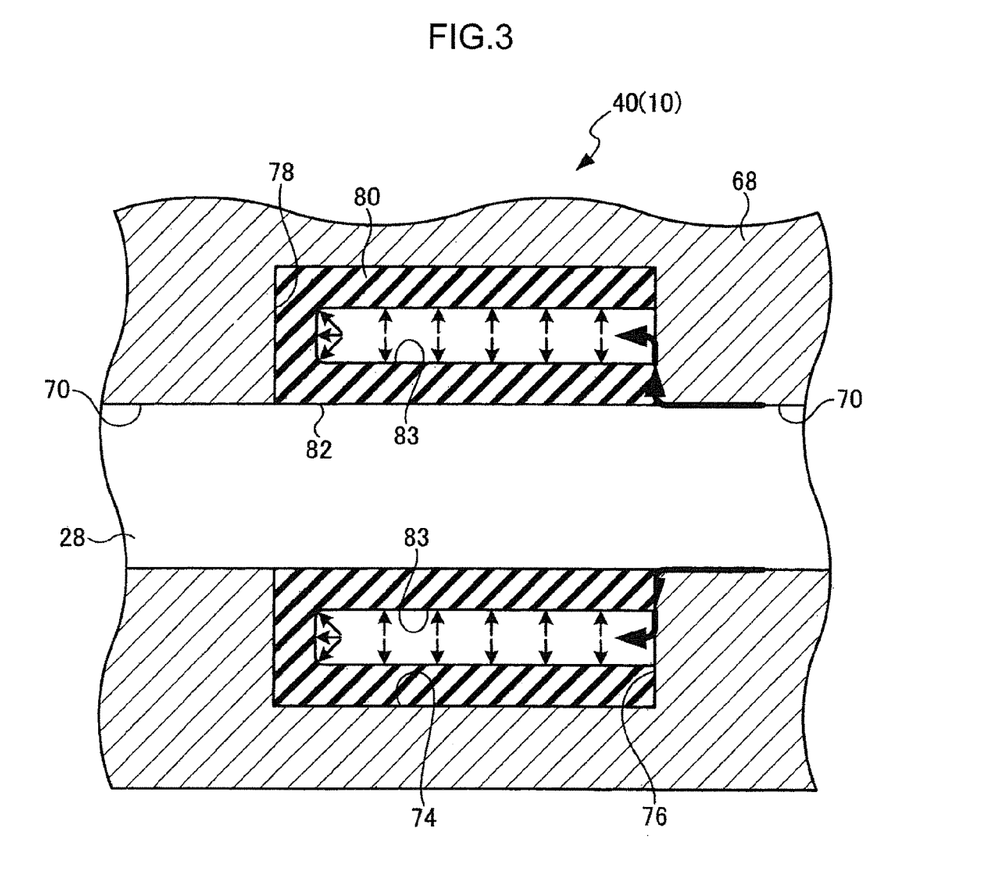
FIG. 3 is an enlarged cross-section of relevant parts taken on line 3-3 of FIG. 2.

Furthermore, a groove portion 83 is formed as a gas intake portion in the packing 80. The groove portion 83 is formed in a bottomed shape, open to the face of the packing 80 that faces the press contact wall 76, and with a bottom portion at the press contact wall 78 side. As shown in FIG. 3, the inner peripheral shape of the groove portion 83 is formed such that the through hole 82 side of the groove portion 83 is a circular shape substantially coaxial to the through hole 82. In contrast thereto, the inner peripheral shape of the groove portion 83 at the packing 80 external peripheral side is formed in a similar shape to the external peripheral shape of the packing 80. The inner peripheral shape of the groove portion 83 is smaller than the external peripheral shape of the packing 80. As shown in FIG. 2 and FIG. 3, corners of the inner peripheral portion of the groove portion 83 are curved around so as to open towards the inward direction of the groove portion 83.

Note that while in the present exemplary embodiment the shape of the groove portion 83 is set as described above, there is no limitation to that described above, as long as configuration is made with a shape having a gas intake portion opening towards the side of the press contact wall 76.

Figure 4:
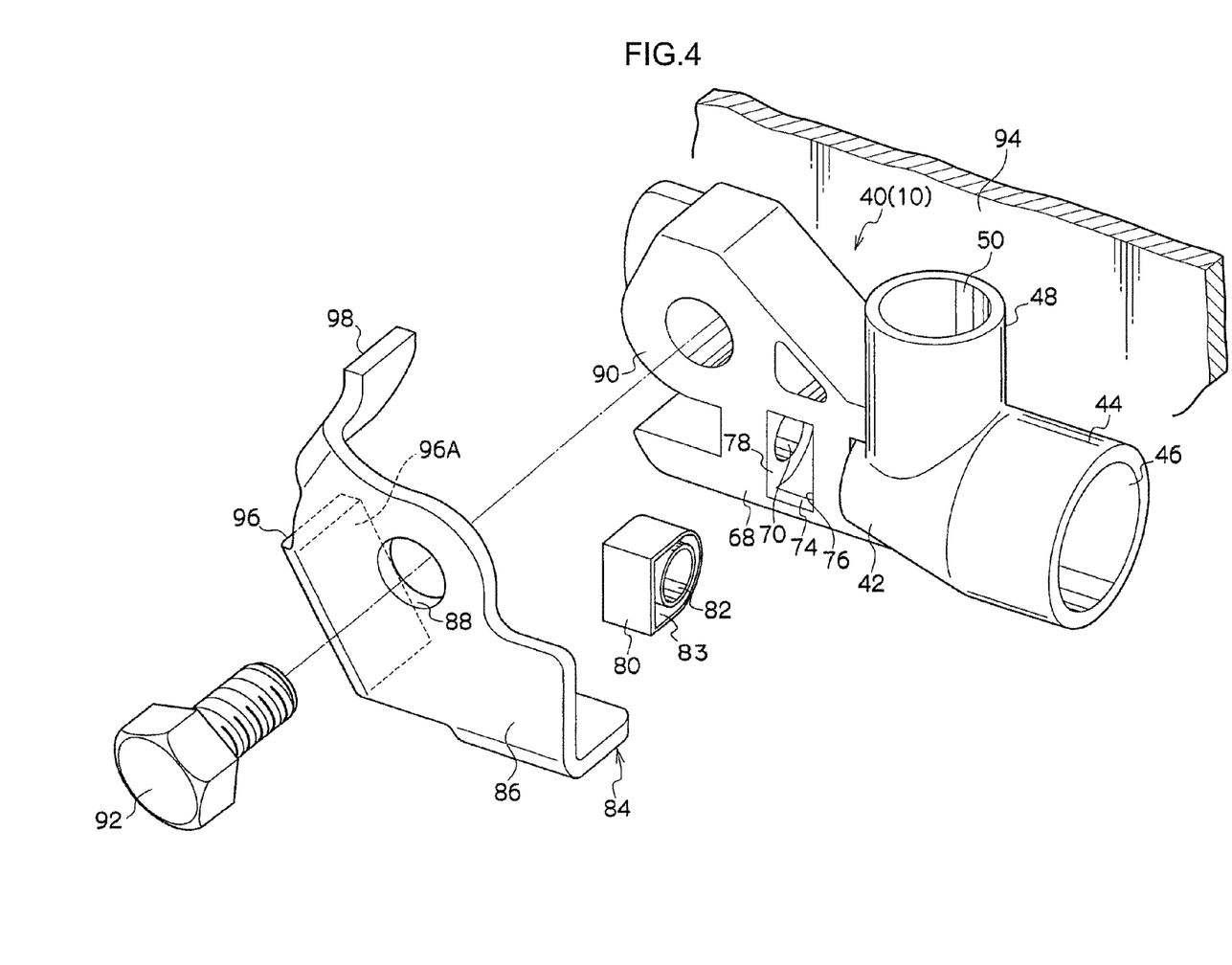
FIG. 4 is an exploded perspective view showing a configuration of relevant parts of a pretensioner according to the first exemplary embodiment of the present invention.

As shown in FIG. 4, the present pretensioner 10 is equipped with a bracket 84. The bracket 84 is equipped with a flat plate shaped bracket main body portion 86, serving as a bracket main body and facing portion. The bracket main body portion 86 is disposed at the front face side of the base cartridge 40 and closes off the packing housing section 74 that is open to the external face of the front face side of the base cartridge 40. A circular hole 88 is formed in the bracket main body portion 86. A circular hole 90 is formed in the base cartridge 40 corresponding to the circular hole 88. One end of the circular hole 90 opens to the front face of the base cartridge 40, and the other end of the circular hole 90 opens to the back face of the base cartridge 40.

In a state in which the bracket 84 is disposed at the front face side of the base cartridge 40, the circular hole 88 and the circular hole 90 are superimposed on each other along the respective piercing directions. In this state, a fixing bolt 92, serving as fastening means, passes through the circular hole 88 and the circular hole 90. The fixing bolt 92 threads into to a female thread portion formed on a pretensioner attachment section 94, which is the frame section of the seat or a portion of the vehicle body, and threads into a nut (including, for example, a welded nut) provided to the pretensioner attachment section 94 at the opposite side to that of the bracket 84. When the fixing bolt 92 is fixed to the pretensioner attachment section 94, the base cartridge 40 is retained nipped between the bracket main body portion 86 and the pretensioner attachment section 94. The present pretensioner 10 is thereby attached to a vehicle, and the packing 80 housed in the packing housing section 74 is pressed against the bracket main body portion 86 of the bracket 84, and movement of the packing 80 is prevented.

Furthermore, in the state in which the fixing bolt 92 is fastened and fixed to the pretensioner attachment section 94 as described above, the bracket main body portion 86 makes pressing contact with the end portion of packing 80 that projects out from the opening of the packing housing section 74, pressing so as to press the packing 80 in towards the bottom portion side of the packing housing section 74, and resiliently deforming the packing 80.

Furthermore, as shown in FIG. 1 and FIG. 3, a guide wall 96 extends out from a portion of the external periphery of the bracket main body portion 86 towards the pretensioner attachment section 94 side. The guide wall 96 configures a guide means as a guide portion and configures a gas interacting means as a gas interacting portion. As shown in FIG. 1, an opposing face 96A that is a face of the guide wall 96 in the thickness direction of the guide wall 96 is provided at the external face of the wire guide portion 68 (the base cartridge 40) so as to face the end of the opening of the wire passage portion 70, such that when the wire 28 at the outside of the base cartridge 40 attempts to straighten back out due to the rigidity of the wire 28, the guide wall 96 interacts with the wire 28, correcting the wire 28 such that the wire 28 curves to follow the external peripheral face of the wire guide portion 68.

Furthermore, a guide wall 98 configuring a guide means extends out above the guide wall 96 towards the pretensioner attachment section 94 side from a portion at the external periphery of the bracket main body portion 86. The guide wall 98, in contrast to the guide wall 96, does not face the end of the opening of the wire passage portion 70, however, when the wire 28 at the outside of the base cartridge 40 attempts to straighten back out due to the rigidity of the wire 28, the guide wall 98 interacts with the wire 28 similarly to the guide wall 96, correcting the wire 28 such that the wire 28 curves to follow the external peripheral face of the wire guide portion 68.

<Operation and Effect of the First Exemplary Embodiment>

Explanation follows regarding the operation and effect relating to operational aspects of the present pretensioner 10.

In a state in which the webbing belt of the seatbelt device is fitted to an occupant seated in the seat, an ECU outputs an ignition signal when, for example, a state of sudden deceleration of the vehicle is detected by a detection means such as, for example, an acceleration sensor provided to the vehicle. This ignition signal is input to the gas generator 52, and a gas generating agent inside the gas generator 52 is ignited. The ignited gas generation agent combusts in a short period of time so as to give rapid gas generation.

The gas generated in this manner is supplied into the gas passage portion 62, and passes further through the gas passage portion 62 to be supplied into the cylinder 12. Due to such a supply of gas over a short period of time, the internal pressure of the cylinder 12 rises rapidly at the open end side of the piston 14. Due to the internal pressure of the cylinder 12 rising rapidly at the open end side of the piston 14, the piston 14 slides towards the bottom portion side of the cylinder 12 while pressing the piece 30 towards the base end side of the cylinder 12.

When the wire 28 is pulled by the piece 30 sliding in this manner, the anchor plate 34, or the buckle 38, attached to the end portion of the wire 28 is pulled, and due thereto tensioning force is applied to the webbing belt 36 fitted over the body of the vehicle occupant. By thus applying tensioning force to the webbing belt 36, any slight sagging of the webbing belt 36, so-called "slack", is taken up, and restraining force, with which the webbing belt 36 restrains the body of an occupant, is increased and the body of the occupant can be more firmly restrained.

However, the gas supplied into the gas passage portion 62 as described above also attempts to pass through between the wire 28 and the wire passage portion 70 open to the inner peripheral portion of the gas passage portion 62. However, since the packing 80 is provided in the packing housing section 74 formed at the intermediate section of the wire passage portion 70, leakage of gas to the opposite side from the packing housing section 74 to that of the wire passage portion 70 and leakage of gas from the opening of the packing housing section 74 in the external face of the wire guide portion 68 is suppressed by the packing 80.

However, any gas that should pass through between the wire 28 and the wire passage portion 70, and passes further between the press contact wall 76 and the packing 80, enters into the groove portion 83, and pressure of such gas presses the internal walls of the groove portion 83 in the directions of the arrows in FIG. 3 and FIG. 4. Accordingly, the packing 80 presses harder against the inner wall of the packing housing section 74 including the press contact wall 78 and against the external peripheral portion of the wire 28. Consequently, leakage of gas to the opposite side from the packing housing section 74 to that of the wire passage portion 70 and leakage of gas from the opening of the packing housing section 74 in the external face of the wire guide portion 68 is even more effectively suppressed, and the gas pressure described further above can efficiently provide pressing force on the piston 14.

However, since the packing housing section 74 in which the packing 80 is housed is open at the outer face at the front face side of the base cartridge 40, even if the packing 80 attempts to move in the movement direction of the wire 28, the packing 80 does not come out from the packing housing section 74. Accordingly, configuration to retain the packing 80 within the packing housing section 74, such as a pull-out prevention clip/pin or the like, is fundamentally unnecessary.

The packing housing section 74 is also formed at an intermediate portion of the wire passage portion 70. Accordingly, gas ejected from the gas generator 52 is not directly ejected against the packing 80, and damage sustained by the packing 80 can be reduced. Accordingly, the sealing capability of the above described packing 80 can be secured.

However, since the packing housing section 74 housing the packing 80 is formed at an intermediate portion of the wire passage portion 70, packing 80 is not housed in the gas passage portion 62 in the present pretensioner 10. Consequently, space does not need to be set aside in the gas passage portion 62 as space for housing the packing 80, or as space such that gas can be allowed to pass through when the packing 80 is housed. Accordingly, the present pretensioner 10 can make the space occupied by the gas passage portion 62 in the base cartridge 40 smaller, and can consequently also make the base cartridge 40 smaller.

Suppose that gas were to pass through the wire passage portion 70, and leak outside the base cartridge 40 from the other end of the wire passage portion 70, then this gas would interact with the opposing face 96A of the guide wall 96. By causing the leaking gas to interact with the opposing face 96A of the guide wall 96, the power of the leak of gas can be attenuated, and the gas can be cooled.

Furthermore, as described above, as the wire 28 is pulled, the packing 80 is pulled by the wire 28 and attempts to move. However, the press contact wall 76 of the packing housing section 74 faces the packing 80 in the direction that the packing 80 is attempting to move. Accordingly, when the packing 80 is pulled by the wire 28 and attempts to move, the packing 80 is pressed against the press contact wall 76. Consequently, even if the packing 80 is pulled by the wire 28 and moves, the packing 80 does not move excessively, and not only is a drop in the sealing capability of the packing 80 caused by the packing 80 moving either prevented or extremely effectively suppressed, but also, due to the packing 80 being pressed against the press contact wall 76, an effective seal can be made between the packing 80 and the press contact wall 76, and a further increase in sealing capability can be expected.

In the present pretensioner 10, the packing housing section 74 housing the packing 80 opens to an external face of the packing housing section 74 (the base cartridge 40) in a direction orthogonal to the length direction of the wire 28 inside the packing housing section 74. Accordingly, housing the packing 80 in the packing housing section 74 (the base cartridge 40) is simple. Furthermore, in a configuration such as this in which the packing housing section 74 has an opening to the external face of the packing housing section 74 (the base cartridge 40), although the inner peripheral shape of the packing housing section 74 cannot be given a taper shape that gradual gets thinner on progression along the packing housing section 74 towards the opposite side to that of the wire passage portion 70, even without such a taper shape, leakage of gas to the opposite side from the packing housing section 74 to that of the wire passage portion 70 and leakage of gas from the opening of the packing housing section 74 in the external face of the wire guide portion 68 can be more effectively suppressed, and the pressure of the gas can be applied to the piston 14 with good efficiency.

<Second Exemplary Embodiment>

Next, explanation follows of a second exemplary embodiment of the present invention. In the explanation of the second exemplary embodiment, parts that are fundamentally the same at those of the first exemplary embodiment are allocated the same reference numerals and further detailed explanation thereof is omitted.

Figure 5:
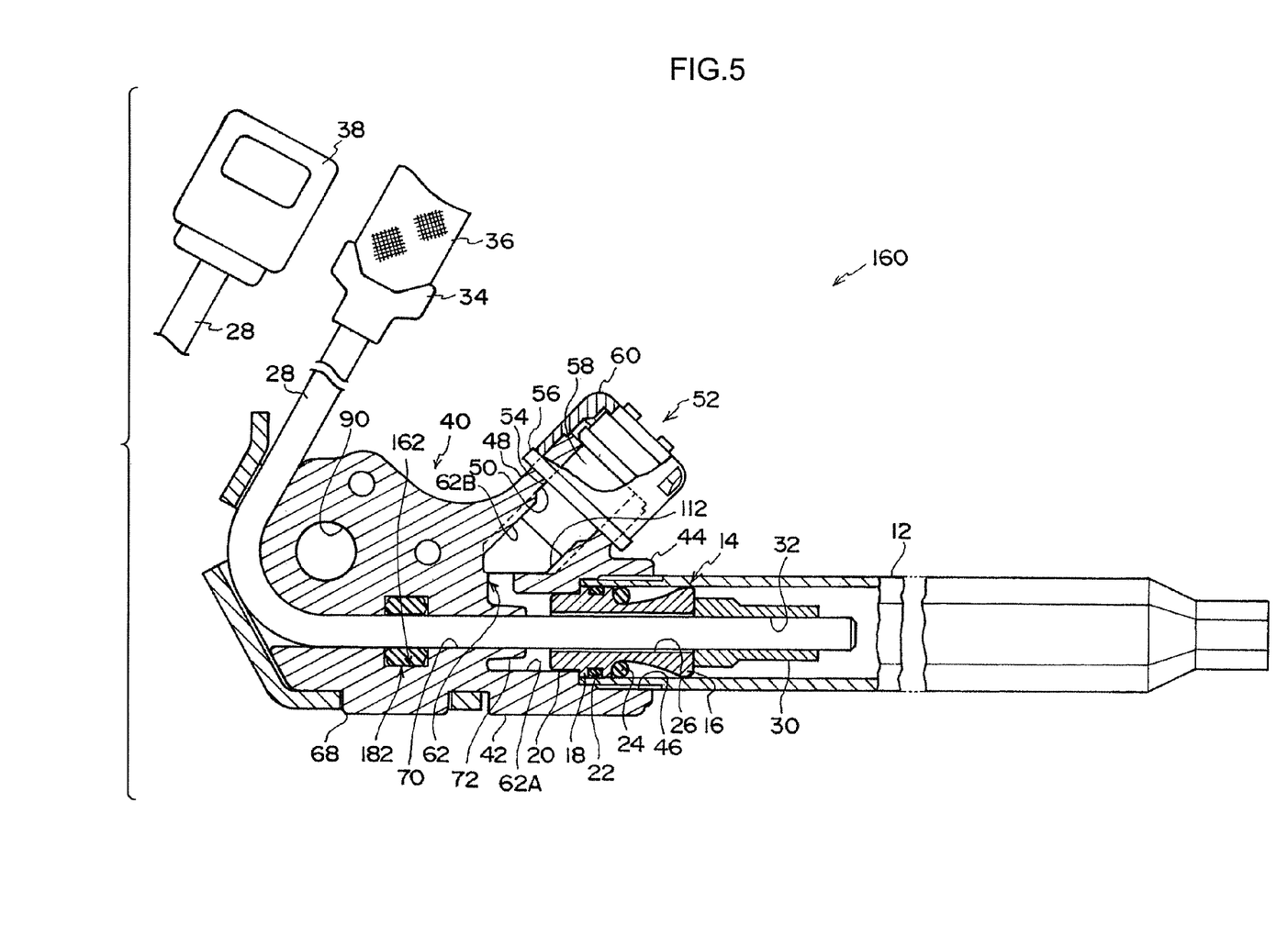
FIG. 5 is a cross-section showing a configuration of relevant parts of the pretensioner according to a second exemplary embodiment of the present invention.
Figure 6:
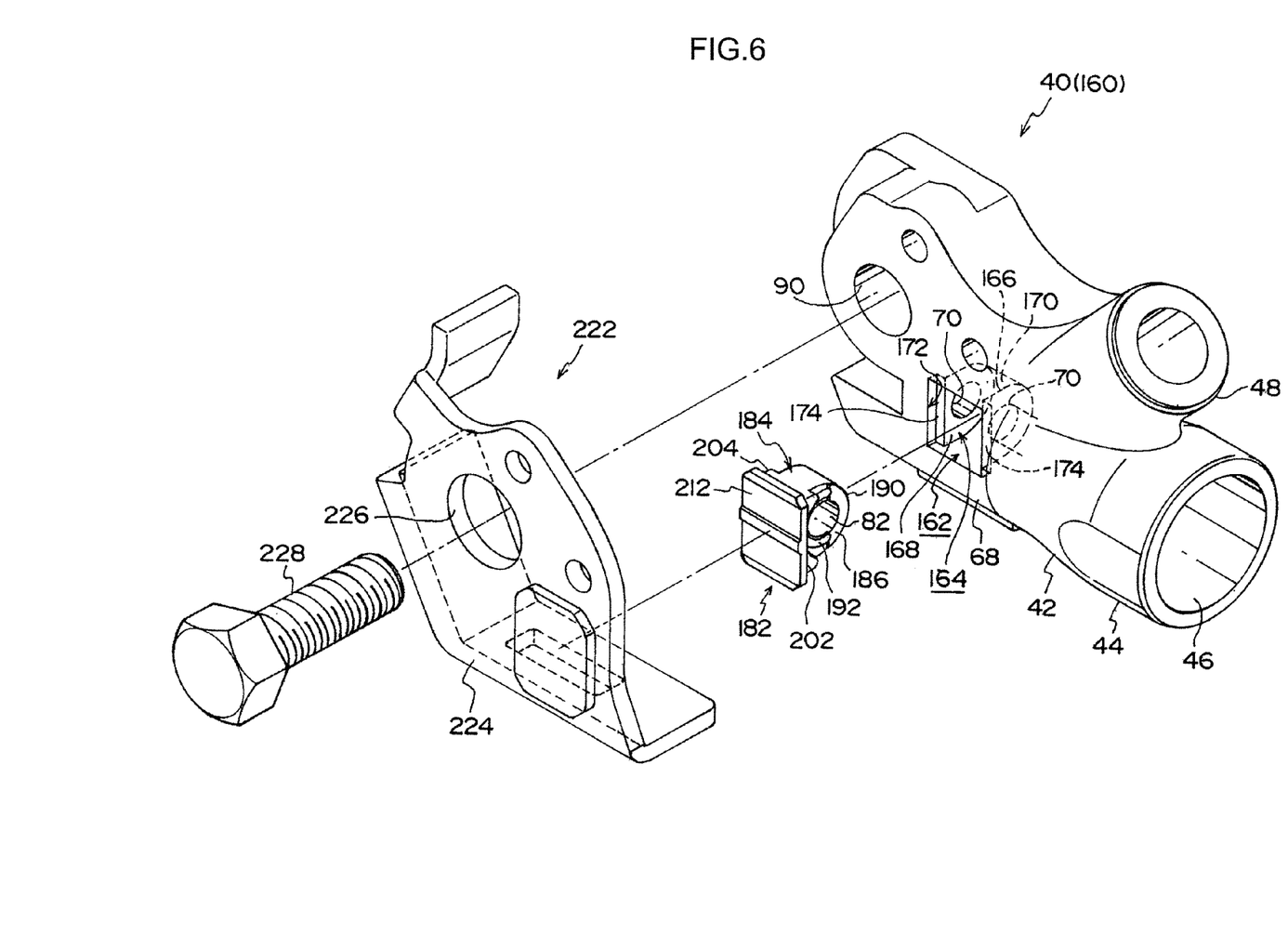
FIG. 6 is an exploded perspective view showing the external appearance of a pretensioner body configuring a pretensioner according to the second exemplary embodiment of the present invention.

A configuration of a pretensioner 160 according to the present exemplary embodiment is shown in cross-section in FIG. 5, corresponding to FIG. 1 used for explaining the first exemplary embodiment. FIG. 6 shows relevant part of the configuration of the pretensioner 160 in an exploded perspective view, corresponding to FIG. 2 used for explaining the first exemplary embodiment.

As shown in FIG. 5, a packing housing section 162 is formed as a seal housing section to the base cartridge 40 configuring the pretensioner 160, instead of forming the packing housing section 74 thereto.

Figure 8:
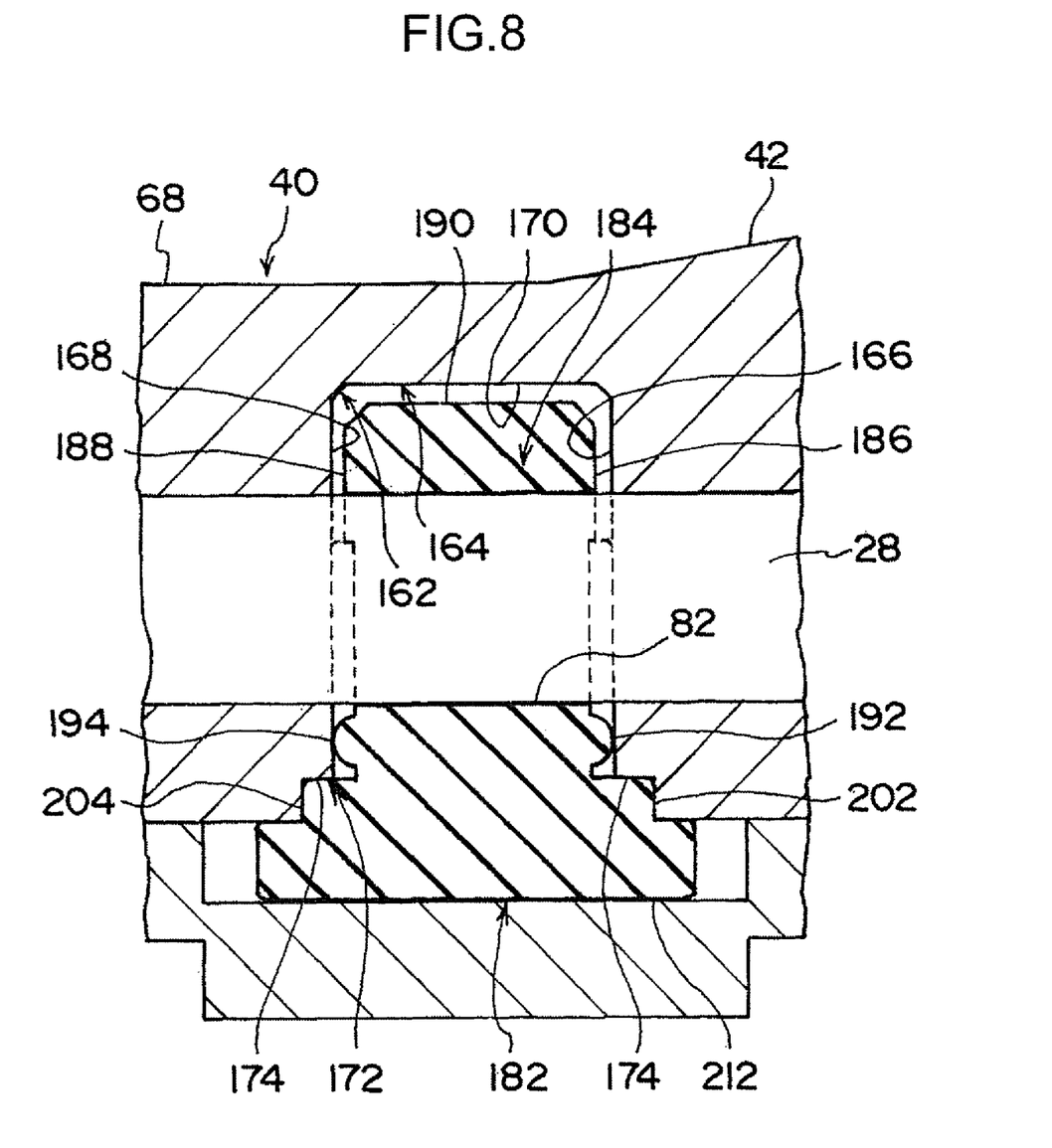
FIG. 8 is a plan view showing a configuration of relevant parts of a pretensioner body configuring a pretensioner according to the second exemplary embodiment of the present invention.

As shown in FIG. 6 and FIG. 8, the packing housing section 162 is equipped with a housing section body 164. The housing section body 164 is configured including press contact walls 166, 168 (these correspond to the "internal wall" referred to in the claims) that face each other along the piercing direction of the wire passage portion 70, and a bottom wall 170 (corresponding to the "bottom portion" referred to in the claims). The wire passage portion 70 opens to substantially central portions of the press contact wall 166 and the press contact wall 168, respectively, and the wire 28 passing through the wire passage portion 70 passes through inside the housing section body 164. The bottom wall 170 is configured by a curving face, curving around an axis, the axial direction of which is along the facing direction of the press contact wall 166 and the press contact wall 168, such that the housing section body 164 is open facing the opposite side to that of the bottom wall 170.

The packing housing section 162 is equipped with a housing section side step 172. The housing section side step 172 is formed adjacent to the housing section body 164, and one end of the housing section side step 172 configures a substantially rectangular shaped opening in the outer face of the base cartridge 40. The other end of the housing section side step 172 is configured by a bottom portion 174. The length of the housing section side step 172 along the wire passage portion 70 piercing direction is longer than the length of the packing housing section 162 along the same direction, and the packing housing section 162 opens at a substantially central location on the bottom portion 174.

Figure 7:
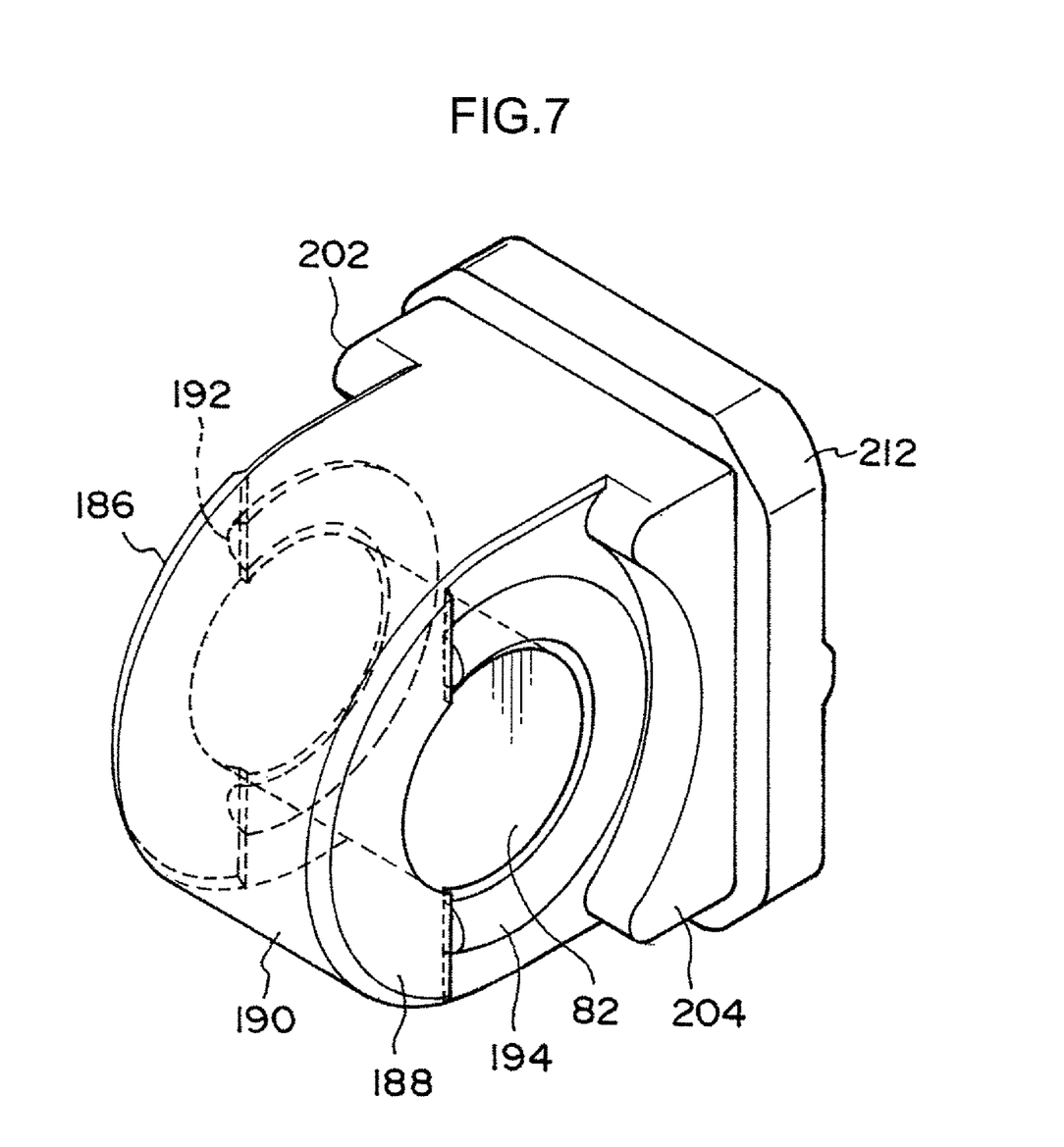
FIG. 7 is a perspective view of a seal configuring a pretensioner according to the second exemplary embodiment of the present invention.

In the above configuration, packing 182, configuring a seal, is housed in the packing housing section 162 instead of the packing 80 of the first exemplary embodiment. As shown in FIG. 6 and FIG. 7, the packing 182 is equipped with a packing main body 184, serving as a seal main body. The external peripheral shape of the packing main body 184 is formed in a rectangular shape, such that the external peripheral shape of the packing main body 184 is substantially equivalent to the inner peripheral shape of the housing section body 164, or such that the dimension of the packing main body 184 along the facing direction of the press contact wall 166 and the press contact wall 168 is slightly smaller than the dimension of the housing section body 164 along the same direction.

A through hole 82, equivalent to the through hole referred to in the claims, is formed in the packing main body 184. The through hole 82 opens to an opposing face 186 that faces the press contact wall 166 in a state in which the housing section body 164 houses the packing main body 184, and opens to an opposing face 188 that faces the press contact wall 168 in a state in which the housing section body 164 houses the packing main body 184, and, similarly to in the first exemplary embodiment, the wire 28 passes through the through hole 82.

Figure 9:
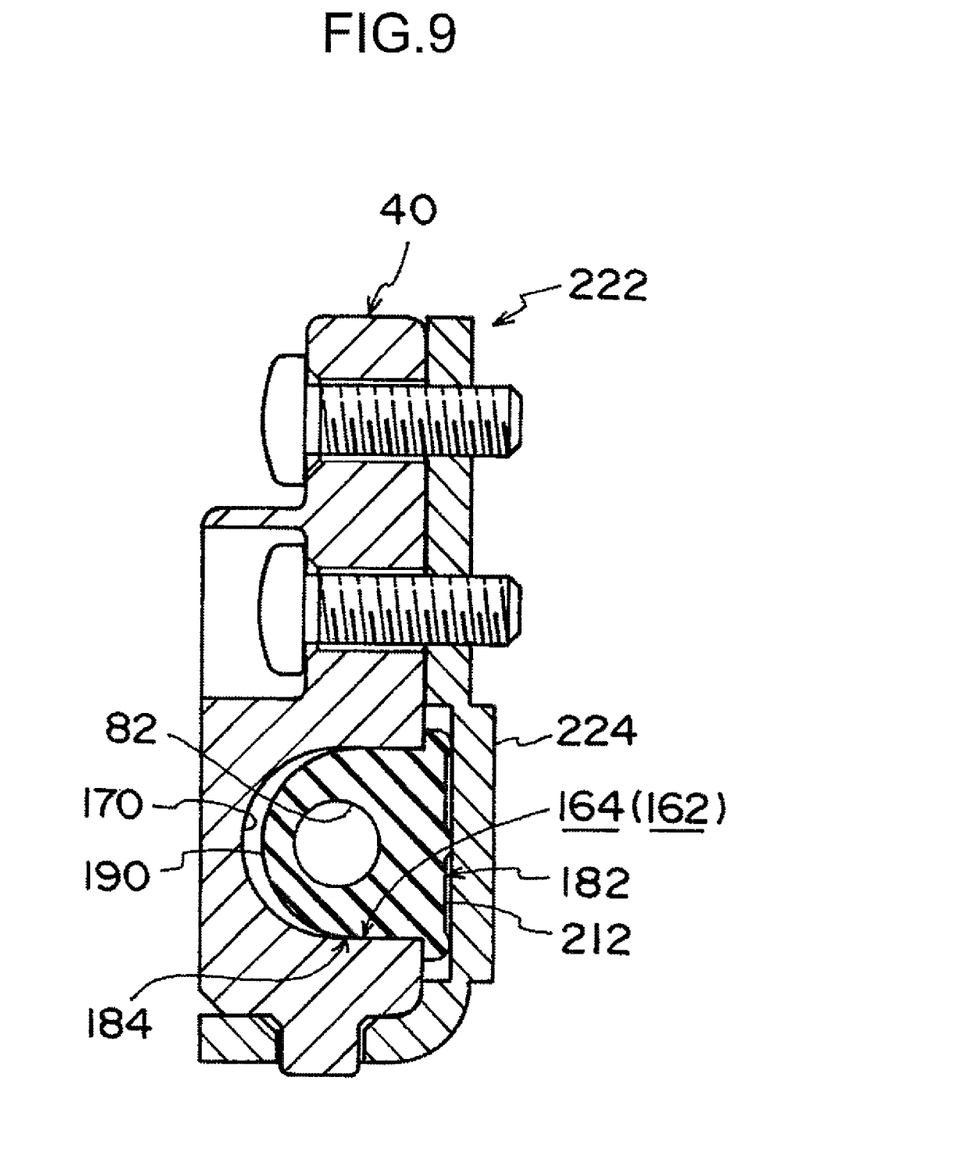
FIG. 9 is a lateral cross-section showing a configuration of relevant parts of a pretensioner body configuring a pretensioner according to the second exemplary embodiment of the present invention.

The face of the packing main body 184 facing the bottom wall 170 is configured by a curved face 190. The curved face 190 curves around an axis, the axial direction of which is from the opposing face 186 side towards the opposing face 188 side, so as to protrude out towards the bottom wall 170 side. However, since the radius of curvature of the curved face 190 is greater than the radius of curvature of the bottom wall 170, as shown in FIG. 8 and FIG. 9, a gap is formed between the bottom wall 170 and the curved face 190 in a state in which the packing main body 184 is housed in the housing section body 164.

Furthermore, a press contact portion 192 is formed so as to protrude out from the opposing face 186 towards the press contact wall 166 side. The press contact portion 192 is formed at the opposite side from a central portion of the opposing face 186 along the packing housing section 162 depth direction (the depth direction being from the open end of the housing section side step 172 towards the bottom wall 170 of the housing section body 164, and the opposite direction thereto) to that of the curved face 190, and is formed around the edge of the opening of the through hole 82. In a state in which the packing main body 184 is housed in the housing section body 164, the press contact portion 192 presses and resiliently deforms the press contact wall 166, and the press contact portion 192 makes close contact with the press contact wall 166.

A press contact portion 194 is formed so as to protrude out from the opposing face 188 towards the press contact wall 168 side. Similarly to the press contact portion 192, the press contact portion 194 is formed at the opposite side from a central portion of the opposing face 188 along the packing housing section 162 depth direction, and is formed around the edge of the opening of the through hole 82. In a state in which the packing main body 184 is housed in the housing section body 164, the press contact portion 194 presses and resiliently deforms the press contact wall 168, and the press contact portion 194 makes close contact with the press contact wall 168.

Packing-side step portions 202, 204 are formed as respective seal side step portions on the packing main body 184 at the opposite side to that of the curved face 190. The packing-side step portion 202 projects out in the direction from the opposing face 188 towards the opposing face 186 further to the outside than the opposing face 186, and when the packing main body 184 has been housed in the housing section body 164, the packing-side step portion 202 faces the bottom portion 174 on the press contact wall 166 side of the housing section side step 172. The face of the packing-side step portion 202 that faces the bottom portion 174 is configured with a curving face that curves around so as to open towards the bottom portion 174. By housing the packing main body 184 in the housing section body 164, the packing-side step portion 202 is pressed by the bottom portion 174, so as to resiliently deform and make close contact with the bottom portion 174.

The packing-side step portion 204 projects out in the direction from the opposing face 186 towards the opposing face 188 further to the outside than the opposing face 188, and when the packing main body 184 has been housed in the housing section body 164, the packing-side step portion 204 faces the bottom portion 174 on the press contact wall 168 side of the housing section side step 172. Similarly to the packing-side step portion 202, the face of the packing-side step portion 204 that faces the bottom portion 174 is configured with a curving face curved around so as to open towards the bottom portion 174. By housing the packing main body 184 in the housing section body 164, the packing-side step portion 204 is pressed by the bottom portion 174, so as to resiliently deform and make close contact with the bottom portion 174.

A lid portion 212 is formed on the opposite side from the packing-side step portions 202, 204 to that of the packing main body 184. The lid portion 212 is formed with an external peripheral shape that is a rectangular shape larger than the shape of the opening of the housing section side step 172 on the external face of the base cartridge 40. In a state in which the packing main body 184 has been housed in the housing section body 164 and the packing-side step portions 202, 204 are housed in the housing section side step 172, the lid portion 212 makes close contact with the external faces of the base cartridge 40 at the periphery of the open end of the housing section side step 172.

The present pretensioner 160 is equipped with a bracket 222. The bracket 222 is equipped with a wall portion 224 that faces the external face at the open side of the housing section side step 172 at the base cartridge 40. A circular hole 226 is formed in the wall portion 224 corresponding to a circular hole 90 formed in the base cartridge 40. The present pretensioner 160 is mounted to the vehicle by passing an attachment bolt 228 through the circular hole 226 and also through the circular hole 90, and fastening to a predetermined position on the vehicle body. In a state in which the pretensioner 160 has been attached to the vehicle by the attachment bolt 228, the wall portion 224 presses the lid portion 212 towards the base cartridge 40, and thus the lid portion 212 makes close contact with the external face of the base cartridge 40 around the periphery of the opening end of the housing section side step 172.

<Operation and Effect of Second Exemplary Embodiment>

Next, explanation follows regarding the operation and effect of the second exemplary embodiment.

In a similar manner to the packing 80 of the pretensioner 10 according to the first exemplary embodiment being fitted into the packing housing section 74, in the present pretensioner 160 the packing main body 184 is fitted into the housing section body 164, and the packing-side step portions 202, 204 are fitted into the housing section side step 172 such that the packing 182 is fitted into the packing housing section 162. In a state in which the packing 182 has been fitted into the packing housing section 162, the press contact portion 192 makes close press contact with the press contact wall 166 of the housing section body 164, and the press contact portion 194 makes close press contact with the press contact wall 168.

In the present pretensioner 160, the press contact portions 192, 194 are formed further to the side of the open end of the packing housing section 162 than central portions of the opposing faces 186, 188 along the packing housing section 162 depth direction. Accordingly, when the packing 182 is being fitted into the packing housing section 162, no great resistance is imparted to the curved face 190 side of the packing 182 from the press contact wall 166 of the housing section body 164 and the opposing face 188, and so is fitted comparatively smoothly therein.

Consequently, even when fitting the packing 182 into the packing housing section 162, large resilient deformation of the packing main body 184, such as, for example, a large collapse in the through hole 82, can be prevented. Due thereto, it is not required to take extra special care when fitting the packing 182 into the packing housing section 162 such that the packing main body 184 is not greatly resiliently deformed, and an operation to rectify any unwanted deformation of the packing 182 after fitting the packing 182 into the packing housing section 162 also becomes unnecessary, thereby raising the productivity of fitting the packing 182 into the packing housing section 162.

In the present pretensioner 160, gas that has been generated by the gas generator 52 and supplied into the gas passage portion 62 presses the piston 14 towards the base end side of the cylinder 12. However, a portion of the gas, similarly to with the pretensioner 10 according to the first exemplary embodiment, flows inside the wire protection tube 72 from the leading end of the wire protection tube 72, and flows further through the wire passage portion 70 towards the packing housing section 162 side. The gas that thus reaches the open end of the wire passage portion 70 at the press contact wall 166 passes through between the press contact wall 166 and the opposing face 186 of the packing main body 184, and also attempts to leak out from the open end of the housing section side step 172 (the open end of the packing housing section 162).

However, in the present pretensioner 160, as described above, due to the press contact portion 192 being in press contact with the press contact wall 166 and resiliently deforming, the press contact portion 192 makes close contact with the press contact wall 166, and due to the press contact portion 194 being in press contact with the press contact wall 168 and resiliently deforming, the press contact portion 194 makes close contact with the press contact wall 168. The sealing capability of the projecting portions, like the press contact portion 192 and the press contact portion 194, in a state of press contact with, and resiliently deformed by, a flat plane wall face, such as the press contact wall 166 and the press contact wall 168, is higher than the sealing capability in cases where a flat plane shape wall face, such as the opposing face 186 and the opposing face 188, simply makes pressing contact with another flat plane shape wall face, such as the press contact wall 166 and the press contact wall 168. Consequently, leakage of the gas that has passed between the press contact wall 166 and the opposing face 186 can be effectively prevented.

In the present pretensioner 160, as described above, the press contact portions 192, 194 are formed further to the open end side (the packing-side step portions 202, 204 and lid portion 212 side) of the packing housing section 162 along the packing housing section 162 depth direction than central portions of the opposing faces 186, 188. Accordingly, at the press contact portion 192, gas attempting to pass through between the press contact wall 166 and the opposing face 186 is trapped by the press contact portion 192, so as to flow to the bottom wall 170 of the packing housing section 162.

The bottom wall 170 curves around so as to open towards the open end side of the packing housing section 162, and the curved face 190 of the packing 182 curves so as to project out towards the bottom wall 170 side. Accordingly, by giving curved shapes to the bottom wall 170 and the curved face 190, portions of the base cartridge 40 in the vicinity of the bottom wall 170, and portions of the packing 182 in the vicinity of the curved face 190 can have high resistance to gas pressure, and occurrences of damage or the like due to gas pressure can be either be prevented or effectively suppressed.

Gas that has flowed through the bottom wall 170 of the packing housing section 162 bypasses the press contact portion 192 and heads towards the open end side of the packing housing section 162. The gas pressure presses the opposing face 186 towards the press contact wall 168 side, widening the gap and attempting to pass between the opposing face 186 and the press contact wall 166. However, the packing-side step portions 202, 204 that are in close contact with the bottom portion 174 of the housing section side step 172 face the bottom portion 174 along the opening direction of the packing housing section 162.

Accordingly, even if the opposing face 186 is pressed and deforms towards the press contact wall 168 side as described above, the packing-side step portion 202 and the packing-side step portion 204 do not separate from the bottom portion 174, the close contact state of the packing-side step portions 202, 204 and the bottom portion 174 is maintained, and the sealing capability between the packing-side step portions 202, 204 and the bottom portion 174 is maintained. Due thereto, leakage of gas between the packing-side step portions 202, 204 and the bottom portion 174, or between the packing-side step portions 202, 204 and the housing section side step 172, can be prevented, or suppressed.

Thus, since in the present pretensioner 160 gas leakage between the internal peripheral portions of the packing housing section 162 and the external peripheral portions of the packing 182 can be prevented or extremely effectively suppressed from leaking out, the pressure of the gas can be effectively applied to sliding the piston 14, and accordingly to pulling the anchor plate 34 or the buckle 38.

In the present pretensioner 160, parts of the configuration other than the packing housing section 162, the packing 182 and the bracket 222, explained above, are fundamentally the same as those of the pretensioner 10 according to the first exemplary embodiment, and so fundamentally similar effects can be obtained to those of the pretensioner 10 according to the first exemplary embodiment by operating the present pretensioner 160 in a similar manner to the pretensioner 10 according to the first exemplary embodiment.

Further, the foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A pretensioner comprising:
a coupling section, a leading end side of the coupling section being either attached to an anchor that is attached to a length direction leading end portion of a webbing belt configuring a seatbelt device, or attached to a buckle for mounting a tongue provided at a length direction intermediate portion of the webbing belt;
a pretensioner body, a base end side of the coupling section extending from the leading end side of the coupling section attached to the anchor or the buckle passing through an inside of the pretensioner body;
a gas generation section that generates gas by actuation, causing the coupling section to move towards a length direction base end side of the coupling section due to pressure of the gas supplied into the pretensioner body;
a seal housing section formed in the pretensioner body on a through passage of the coupling section, the seal housing section having an opening to an external face of the pretensioner body towards a direction that intersects with the length direction of the coupling section passing through an inside of the seal housing section; and
a seal section, the seal section being formed with a through hole through which the coupling section passes and being housed in the seal housing section from the opening of the seal housing section in the pretensioner body, the seal section having a press contact portion that, in a state in which the seal section is housed in the seal housing section and the coupling section has been passed through the through hole, is capable of pressing to contact with at least one of an internal wall of the seal housing section or the coupling section, and the seal section sealing between the seal section and at least one of the internal wall of the seal housing section or the coupling section due to the press contact portion pressing at least one of the internal wall of the seal housing section or the coupling section.

2. The pretensioner of claim 1, wherein:
the seal housing section is formed in a bottomed shape having a bottom portion at the opposite side from the opening of the seal housing section in the external face of the pretensioner body; and
the press contact portion is formed to project out from an end portion of the seal section that faces the internal wall of the seal housing section towards the internal wall of the seal housing section, presses to contact with the internal wall of the seal housing section, and is provided nearer to the opening of the seal housing section than a central portion of the seal section along a depth direction of the seal housing section.

3. The pretensioner of claim 1, wherein:
the seal housing section comprises,
  a housing side step portion that has an opening to the external face of the pretensioner body and is provided with a bottom portion on an opposite side from the opening of the housing side step portion at the external face of the pretensioner body, and
  a housing main body that opens at the bottom portion of the housing side step portion and opens at an internal wall to the through hole; and
the seal section comprises,
  a seal main body housed in the housing main body, and
  a seal side step portion that is integrally formed at the seal main body, and contacts the bottom portion of the housing side step portion in a state in which the seal main body is housed in the housing main body.

4. The pretensioner of claim 1, wherein a bottom portion is provided to the seal housing section at an opposite side from the opening of the seal housing section in the external face of the pretensioner body, and the bottom portion curves around so as to open towards the opening.

5. The pretensioner of claim 1, wherein:
the seal section has a face that faces at least one of the internal wall of the seal housing section or the coupling section;
a gas intake portion is formed at the seal section, the gas intake portion opening towards an upstream side of a flow of gas moving towards the seal housing section along the length direction of the coupling section and the gas moving towards the seal housing section along the length direction of the coupling section being taken inside the gas intake portion; and
pressure of the gas taken inside the gas intake portion causes the press contact portion to contact at least one of the internal wall or the coupling section.

* * * * *